United States Patent [19]
Lange et al.

[11] Patent Number: 5,972,872
[45] Date of Patent: Oct. 26, 1999

[54] ENZYME PREPARATION WITH CELLULYTIC ACTIVITY

[75] Inventors: Lene Lange; Jack Bech Nielsen; Martin Schulein, all of Bagsvaerd, Denmark

[73] Assignee: Novo Nordisk A/S, Bagsvaerd, Denmark

[21] Appl. No.: 08/870,996

[22] Filed: Jun. 6, 1997

Related U.S. Application Data

[63] Continuation of application No. PCT/DK98/00518, Dec. 22, 1995.

[30] Foreign Application Priority Data

Dec. 22, 1994 [DK] Denmark .................................. 1471/94

[51] Int. Cl.⁶ .............................. C11D 3/386; C12N 9/42
[52] U.S. Cl. ..................... 510/392; 510/395; 510/530; 510/320; 510/321; 510/305; 510/226; 435/209
[58] Field of Search ..................... 510/392, 393, 510/530, 320, 321, 305, 226; 435/209

[56] References Cited

U.S. PATENT DOCUMENTS

| | | | |
|---|---|---|---|
| 4,832,864 | 5/1989 | Olson | 252/174.112 |
| 4,962,030 | 10/1990 | Kawai et al. | 435/209 |
| 5,133,893 | 7/1992 | Thom et al. | 252/69 |

FOREIGN PATENT DOCUMENTS

| | | |
|---|---|---|
| 58-16682 | 1/1983 | Japan . |
| 96/19570 | 6/1996 | WIPO . |

OTHER PUBLICATIONS

Kamariah et al., Mardi Res. J., vol. 21, No. 2, pp. 179–186 (1993).
Kamariah et al., Mycol. Res., vol. 95, No. 9, pp. 1077–1081 (1991).

*Primary Examiner*—Kery Fries
*Attorney, Agent, or Firm*—Steve T. Zelson, Esq.; Valeta Gregg, Esq.

[57] ABSTRACT

The present invention relates to detergent compositions comprising an enzyme preparation with substantial cellulytic activity, especially endoglucanase activity, at alkaline conditions which is enzyme composition is derived from or producible by a fungus selected from the Basidiomycetous families Coprinaceae and Bolbitiaceae, preferably from the group of strains belonging to the genera Psathyrella, Podaxis, Panaeolus, Coprinus and Bolbitius, more preferably from the group of strains belonging to the species *Coprinus micaceus, Coprinus domesticus, Coprinus ephemerus, Coprinus disseminatus, Coprinus radians, Coprinus picaceus, Coprinus frisei, Coprinus subimpatiens, Psathyrella candolleana, Psathyrella prona, Panaeolus semiovatus, Podaxis pistillaris* and *Bolbitius aleuriatus*; and a method for providing a stone-washed look to textiles, especially to cellulosic fabric such as denim, using the mentioned enzyme preparation; and a method for improving the drainage of paper pulp or the de-inking of recycled paper using the mentioned enzyme preparation; and an enzyme preparation with substantial cellulytic activity at alkaline conditions which is enzyme composition is derived from or producible by a fungus selected from the Basidiomycetous families Coprinaceae and Bolbitiaceae, provided that the fungus does not belong to the species *Coprinus cinereus*.

15 Claims, No Drawings

ENZYME PREPARATION WITH CELLULYTIC ACTIVITY

CROSS-REFERENCE TO RELATED APPLICATIONS

This application is a continuation of application Ser. No. PCT/DK95/00518 filed Dec. 22, 1995 and claims priority under 35 U.S.C. 119 of Danish application Ser. No. 1471/94 filed Dec. 22, 1994, the contents of which are fully incorporated herein by reference.

FIELD OF INVENTION

The present invention relates to a detergent composition comprising an enzyme preparation with alkaline cellulytic activity, a method for treating fabric by using a cellulytic enzyme preparation, a method for treatment of paper pulp by using a cellulytic enzyme preparation, an enzyme preparation derived from or producible by a fungus belonging to the families Coprinaceae and Bolbitiaceae, and use of the enzyme preparation e.g. in the detergent industry, the textile industry and the paper pulp industry.

BACKGROUND OF THE INVENTION

Cellulases or cellulytic enzymes are enzymes involved in hydrolysis of cellulose. In the hydrolysis of native cellulose, it is known that there are three major types of cellulase enzymes involved, namely cellobiohydrolase (1,4-β-D-glucan cellobiohydrolase, EC 3.2.1.91), endo-β-1,4-glucanase (endo-1,4-β-D-glucan 4-glucanohydrolase, EC 3.2.1.4) and β-glucosidase (EC 3.2.1.21).

Cellulases are synthesized by a large number of microorganisms which include fungi, actinomycetes, myxobacteria and true bacteria but also by plants. Especially endoglucanases of a wide variety of specificities have been identified.

A very important industrial use of cellulytic enzymes is the use for treatment of cellulosic textile or fabric, e.g. as ingredients in detergent compositions or fabric softener compositions, for bio-polishing of new fabric (garment finishing), and for obtaining a "stone-washed" look of cellulose-containing fabric, especially denim, and several methods for such treatment have been suggested, e.g. in GB-A-1 368 599, EP-A-0 307 564 and EP-A-0 435 876, WO 91/17243, WO 91/10732, WO 91/17244, PCT/DK95/000108 and PCT/DK95/00132.

Another important industrial use of cellulytic enzymes is the use for treatment of paper pulp, e.g. for improving the drainage or for deinking of recycled paper.

Especially the endoglucanases (EC No. 3.2.1.4) constitute a interesting group of hydrolases for the mentioned industrial uses. Endoglucanases catalyzes endo hydrolysis of 1,4-β-D-glycosidic linkages in cellulose, cellulose derivatives (such as carboxy methyl cellulose and hydroxy ethyl cellulose), lichenin, β-1,4 bonds in mixed β-1,3 glucans such as cereal (β-D-glucans or xyloglucans and other plant material containing cellulosic parts. The authorized name is endo-1,4-β-D-glucan 4-glucano hydrolase, but the abbreviated term endoglucanase is used in the present specification. Reference can be made to T. -M. Enveri, "Microbial Cellulases" in W. M. Fogarty, Microbial Enzymes and Biotechnology, Applied Science Publishers, pp. 183–224 (1983); Methods in Enzymology, (1988) Vol.160, p.200–391 (edited by Wood, W. A. and Kellogg, S. T.); Béguin, P., "Molecular Biology of Cellulose Degradation", Annu. Rev. Microbiol. (1990), Vol. 44, pp. 219–248; Béguin, P. and Aubert, J -P., "The biological degradation of cellulose", FEMS Microbiology Reviews 13 (1994) p.25–58; Henrissat, B., "Cellulases and their interaction with cellulose", Cellulose (1994), Vol. 1, pp. 169–196.

Fungal endoglucanases have been described in numerous publications, especially those derived from species as e.g. *Fusarium oxysporum, Trichoderma reesei, Trichoderma longibrachiatum, Aspergillus aculeatus, Neocallimastix patriciarum,* and e.g. from species of the genera Piromyces, Humicola, Myceliophthora, Geotricum, Penicillium, Irpex.

Cellulases derived from *Coprinus cinereus* have been disclosed e.g. in Mardi Research Journal, 21 (2), 1993, p-179–186; Mycological Research (1991), 95, Pt.9. p.1077–81; European Journal of Biochemistry (1988), 174 (4), p. 724–732. Further, according to the latest developments in taxonomy, both *Coprinus macrorhizus* and *Coprinus fimetarius* are to be considered synonyms to *Coprinus cinereus.*

There is an ever existing need for providing novel cellulase enzyme preparations which may be used for applications where cellulase, preferably an endoglucanase, activity is desirable.

The object of the present invention is to provide novel enzyme preparations having substantial cellulytic activity, preferably at alkaline conditions, and improved performance in paper pulp processing, textile treatment, laundry processes and/or in animal feed; preferably novel cellulases, more preferably endoglucanases, which are contemplated to be be producible or produced by recombinant techniques.

SUMMARY OF THE INVENTION

It has now surprisingly been found that also species belonging to the part of the families Coprinaceae and Bolbitiaceae which are not the section of the genus Coprinus denoted Coprinus sect. Coprinus are capable of producing enzyme preparations with substantial cellulytic activity, especially endoglucanase activity.

Thus, more specifically, in a first aspect the present invention relates to a detergent composition comprising an enzyme preparation with substantial cellulytic activity at alkaline conditions which is derived from or producible by a fungus selected from the Basidiomycetous families Coprinaceae and Bolbitiaceae and a surfactant.

In a second aspect, the present invention relates to a method of providing localized variation in the color density of dyed fabric by treating the fabric with an enzyme preparation with substantial cellulytic activity which is derived from or producible by a fungus selected from the Basidiomycetous families Coprinaceae and Bolbitiaceae.

In a third and fourth aspect, the present invention relates to a method for improving the drainage of an aqueous suspension of paper pulp and for deinking of recycled paper, respectively, by treating paper pulp with an enzyme preparation with substantial cellulytic activity which is derived from or producible by a fungus selected from the Basidiomycetous families Coprinaceae and Bolbitiaceae.

In a further aspect, the present invention relates to novel cellulytic enzyme preparations which are derivable from or producible by a fungus selected from the Basidiomycetous families Coprinaceae and Bolbitiaceae, provided that the fungus does not belong to the species *Coprinus cinereus*; preferably selected from the group of strains belonging to the genera Psathyrella, Podaxis, Panaeolus, Coprinus and Bolbitius; more preferably selected from the group of strains belonging to the subsections Coprinus sect. Hemerobi, Coprinus sect. Setulosi, Coprinus sect. Vestiti and Coprinus sect. Micacei of the genus Coprinus; especially selected from the group of strains belonging to the species *Coprinus micaceus, Coprinus domesticus, Coprinus ephemerus, Coprinus disseminatus, Coprinus radians, Coprinus picaceus, Coprinus frisei, Coprinus subimpatiens, Psathyrella candolleana, Psathyrella prona, Panaeolus semiovatus, Podaxis pistillaris* and *Bolbitius aleuriatus*.

Further, the enzyme preparation of the invention may be useful in any industrial process requiring a cellulase, preferably an alkaline endoglucanase, e.g. for providing localized variation in the color density of dyed fabric such as stone-washing of denim, for improving the drainage of an aqueous suspension of paper pulp, for the de-inking of recycled paper, in detergent compositions and in fabric softeners.

DETAILED DESCRIPTION OF THE INVENTION

In the primary screening of fungal sources which may be capable of producing an enzyme with substantial cellulytic activity, especially at alkaline conditions, the screening for fungal sources (obtained e.g. from soil) may be carried out by soil dilution, direct inoculation by soil dust, small particles or plant roots on solid Chapek and Hetchinson media, and the species may be identified by inoculation of isolated culture on a conventional solid medium in petri dishes. Then, the presence of cellulytic activity may be qualitatively estimated by visual observation of fungal growth on filter paper or formation of clear zones on solid media containing amorphous cellulose. Further, the presence of cellulase activity under alkaline conditions may be estimated by 7–10 days of cultivation on agar-amorphous acid swollen cellulose at 28° C., installation of block into agar containing 0.1% AZCL-HE-cellulose (from Megazyme, Australia) at pH 9.5–10 and incubation at 40° C. for ½–2 days, and visual detection of cellulytic activity by observing a blue halo surrounding the block.

The strains *Coprinus cinereus*, IFO 30116, and *Podaxis pistillaris*, ATCC 38868, are both believed to be commercially available strains which were published in the catalogue of the relevant depositary institution at the priority date of this patent application.

The strain *Coprinus micaceus* was deposited under the deposition number CBS 816.95 on Dec. 19, 1995 at the CBS—Centraalbureau voor Schimmelcultures, P.O.Box 273, NL-3740 AG Baarn, the Netherlands, according to the provisions of the Budapest Treaty on the International Recognition of the Deposit of Microorganisms for the Purposes of Patent Procedure (the Budapest Treaty).

The strain *Coprinus domesticus* was deposited under the deposition number CBS 817.95 on Dec. 19, 1995 at the CBS—Centraalbureau voor Schimmelcultures, P.O.Box 273, NL-3740 AG Baarn, the Netherlands, according to the Budapest Treaty.

The strain *Coprinus ephemerus* was deposited under the deposition number CBS 821.95 on Dec. 19, 1995 at the CBS—Centraalbureau voor Schimmelcultures, P.O.Box 273, NL-3740 AG Baarn, the Netherlands, according to the Budapest Treaty.

The strain *Coprinus radians* was deposited under the deposition number CBS 818.95 on Dec. 19, 1995 at the CBS—Centraalbureau voor Schimmelcultures, P.O.Box 273, NL-3740 AG Baarn, the Netherlands, according to the Budapest Treaty.

The strain *Bolbitius aleuriatus* was deposited under the deposition number CBS 820.95 on Dec. 19, 1995 at the CBS according to the Budapest Treaty.

The strain *Panaeolus semiovatus* (syn. *P. fimiputris*) was deposited under the deposition number CBS 819.95 on Dec. 19, 1995 at the CBS—Centraalbureau voor Schimmelcultures, P.O.Box 273, NL-3740 AG Baarn, the Netherlands, according to the Budapest Treaty.

The strain *Psathyrella prona* was deposited under the deposition number CBS 822.95 on Dec. 19, 1995 at the CBS—Centraalbureau voor Schimmelcultures, P.O.Box 273, NL-3740 AG Baarn, the Netherlands, according to the Budapest Treaty.

The strain *Psathyrella candolleana* was deposited under the deposition number CBS 628.95 on Aug. 16, 1995 at the CBS—Centraalbureau voor Schimmelcultures, P.O.Box 273, NL-3740 AG Baarn, the Netherlands, according to the Budapest Treaty.

The Enzyme

In the present context, the term "cellulytic activity" refers to the ability of the enzyme to degrade cellulose to glucose, cellobiose, triose and other cello-oligosaccharides or to degrade cellulose derivatives such as xyloglucan, lichenin and beta-glucan. This ability may be determined by the formation of clearing zones in a carboxymethyl cellulose (CMC) gel or AZCL-HE-cellulose under the conditions specified below.

In the present context the term "enzyme" is understood to include a mature protein or a precursor form thereof as well to a functional fragment thereof which essentially has the activity of the full-length enzyme. Furthermore, the term "enzyme" is intended to include homologues of said enzyme. Such homologues comprise an amino acid sequence exhibiting a degree of identity of at least 60% with the amino acid sequence of the parent enzyme, i.e. the parent cellulase. The degree of identity may be determined by conventional methods, see for instance, Altshul et al., *Bull. Math. Bio.* 48: 603–616, 1986, and Henikoff and Henikoff, *Proc. Natl. Acad. Sci. USA* 89: 10915–10919, 1992. Briefly, two amino acid sequences are aligned to optimize the alignment scores using a gap opening penalty of 10, a gap extension penalty of 1, and the "blosum 62" scoring matrix of Henikoff and Henikoff, supra.

Alternatively, the homologue of the enzyme may be one encoded by a nucleotide sequence hybridizing with an oligonucleotide probe prepared on the basis of the nucleotide sequence or an amino acid sequence under the following conditions: presoaking in 5×SSC and prehydbridizing for 1 hr. at about 40° C. in a solution of 20% formamide, 5 X Denhardt's solution, 50 mM sodium phosphate, pH 6.8, and 50 μg denatured sonicated calf thymus DNA, followed by hybridization in the same solution supplemented with 100 μM ATP for 18 hrs. at about 40° C., followed by a wash in 0.4×SSC at a temperature of about 45° C.

Molecules to which the oligonucleotide probe hybridizes under these conditions are detected using standard detection procedures (e.g. Southern blotting).

Homologues of the present enzyme may have one or more amino acid substitutions, deletions or additions. These changes are preferably of a minor nature, that is conservative amino acid substitutions that do not significantly affect the folding or activity of the protein, small deletions, typically of one to about 30 amino acids; small amino- or carboxyl-terminal extensions, such as an amino-terminal methionine residue, a small linker peptide of up to about 20–25 residues, or a small extension that facilitates purification, such as a poly-histidine tract, an antigenic epitope or a binding domain. See in general Ford et al., *Protein Expression and Purification* 2: 95–107, 1991. Examples of conservative substitutions are within the group of basic amino acids (such as arginine, lysine, histidine), acidic amino acids (such as glutamic acid and aspartic acid), polar amino acids (such as glutamine and asparagine), hydrophobic amino acids (such as leucine, isoleucine, valine), aromatic amino acids (such as phenylalanine, tryptophan, tyrosine) and small amino acids (such as glycine, alanine, serine, threonine, methionine).

It will be apparent to persons skilled in the art that such substitutions can be made outside the regions critical to the function of the molecule and still result in an active enzyme. Amino acids essential to the activity of the enzyme of the invention, and therefore preferably not subject to substitution, may be identified according to procedures known in the art, such as site-directed mutagenesis or alanine-scanning mutagenesis (Cunningham and Wells, *Science* 244, 1081–1085, 1989). In the latter technique mutations are introduced at every residue in the molecule, and the resultant mutant molecules are tested for cellulytic activity to identify amino acid residues that are critical to the activity of the molecule. Sites of ligand-receptor interaction can also be determined by analysis of crystal structure as determined by such techniques as nuclear magnetic resonance, crystallography or photoaffinity labelling. See, for example, de Vos et al., *Science* 255: 306–312, 1992; Smith et al., *J. Mol. Biol.* 224: 899–904, 1992; Wlodaver et al., FEBS Lett. 309: 59–64, 1992.

The homologue may be an allelic variant, i.e. an alternative form of a gene that arises through mutation, or an altered enzyme encoded by the mutated gene, but having substantially the same activity as the enzyme of the invention. Hence mutations can be silent (no change in the encoded enzyme) or may encode enzymes having altered amino acid sequence.

A homologue of the enzyme may be isolated by preparing a genomic or cDNA library of a cell of the species in question, and screening for DNA sequences coding for all or part of the homologue by using synthetic oligonucleotide probes in accordance with standard techniques, e.g. as described by Sambrook et al., *Molecular Cloning:A Laboratory Manual,* 2nd. Ed. Cold Spring Harbor Laboratory, Cold Spring Harbor, N.Y., 1989, or by means of polymerase chain reaction (PCR) using specific primers as described by Sambrook et al., supra.

The enzyme of the invention is in isolated form, i.e. provided in a condition other than its native environment which is soil, possibly Danish forest soils. In a preferred form, the isolated enzyme is substantially free of other proteins, particularly other enzymes of fungal origin. The enzyme preparation of the present invention may, for instance, be isolated from fungi.

In one embodiment, the enzyme preparation of the present invention is obtainable from the supernatant of a fungus selected from the Basidiomycetous families Coprinaceae and Bolbitiaceae, provided that the fungus does not belong to the species *Coprinus cinereus*. In a preferred embodiment, the fungus is selected from the group of strains belonging to the genera Psathyrella; Podaxis; Panaeolus; Coprinus, especially the subsections Coprinus sect. Hemerobi, Coprinus sect. Setulosi, Coprinus sect. Vestiti and Coprinus sect. Micacei of the genus Coprinus; and Bolbitius.

In an especially preferred embodiment, the enzyme preparation of the present invention is produced or producible by fungus selected from the group of strains belonging to the species *Coprinus micaceus, Coprinus domesticus, Coprinus ephemerus, Coprinus disseminatus, Coprinus radians, Coprinus picaceus, Coprinus frisei, Coprinus subimpatiens, Psathyrella candolleana, Psathyrella prona, Panaeolus semiovatus, Podaxis pistillaris* and *Bolbitius aleuriatus*; especially by the strains *Coprinus micaceus*, CBS 816.95; *Coprinus domesticus*, CBS 817.95; *Coprinus ephemerus*, CBS 821.95; *Coprinus radians*, CBS 818.95; *Podaxis pistillaris*, ATCC 38868; *Bolbitius aleuriatus*, CBS 820.95; *Panaeolus semiovatus* (syn. *P. fimiputris*), CBS 819.95; *Psathyrella prona*, CBS 822.95; and *Psathyrella candolleana*, CBS 628.95.

The enzyme preparation of the invention has substantial cellulytic activity, i.e. the activity can be any of the mentioned cellulytic activities. Preferably, the cellulytic activity is endoglucanase activity.

The enzyme preparation of the invention can further comprise one or more enzymes selected from the group consisting of galactanases, xylanases, arabinanases, pectin acetyl esterases, polygalacturonases, rhamnogalacturonases, pectin lyases, pectate lyases, endo-glucanases, pectin methylesterases, proteases, lipases, amylases, cutinases, peroxidases, laccases, cellobiohydrolases and transglutaminases.

The enzyme preparation may be assayed using procedures known in the art. For example, the enzyme preparation of the invention has a pH optimum above about 7, more preferably above about 8, especially above about 9.

Preferably, the enzyme preparation of the invention is stable in the presence of sodium linear alkylbenzene sulphonate, sodium polyoxyethylene alkyl sulphate, sodium dodecyl sulphate, sodium α-olefin sulphonate, sodium alkyl sulphonate, and α-sulpho-fatty acid ester.

The enzyme preparation of the invention can be produced in a conventional manner by the cultivation, in a suitable nutrient medium, of a strain selected from the group consisting of *Coprinus micaceus*, CBS 816.95, *Coprinus domesticus*, CBS 817.95, *Coprinus ephemerus*, CBS 821.95, *Coprinus radians*, CBS 818.95, *Podaxis pistillaris*, ATCC 38868, *Panaeolus semiovatus* (syn. *P. fimiputris*), CBS 819.95, *Bolbitius aleuriatus*, CBS 820.95, *Psathyrella prona*, CBS 822.95, *Psathyrella candolleana*, CBS 628.95, and recovering the enzyme preparation from the resulting medium.

It may be preferred to provide the enzyme preparation in a highly purified form, i.e. greater than 90% pure, more preferably 95% and most preferably 99% pure, as determined by SDS-PAGE.

It is contemplated that the active enzyme component of the enzyme preparation of the invention can be produced by recombinant DNA techniques. The DNA sequence of the invention encoding an enzyme exhibiting endoglucanase activity may be isolated by a general method involving cloning, in suitable vectors, a DNA library from *Coprinus micaceus*, CBS 816.95; *Coprinus domesticus*, CBS 817.95; *Coprinus ephemerus*, CBS 821.95; *Coprinus radians*, CBS 818.95; *Podaxis pistillaris*, ATCC 38868; *Bolbitius aleuriatus, CBS* 820.95; *Panaeolus semiovatus* (syn. *P. fimiputris*), CBS 819.95; *Psathyrella prona, CBS* 822.95; or *Psathyrella candolleana*, CBS 628.95, respectively, transforming suitable yeast host cells with said vectors, culturing the host cells under suitable conditions to express any enzyme of interest encoded by a clone in the DNA library, screening for positive clones by determining any cellulase or endoglucanase activity of the enzyme produced by such clones, and isolating the enzyme encoding DNA from such clones. The general method is further disclosed in WO 94/14953.

The DNA sequence coding for the enzyme may for instance be isolated by screening a cDNA library of the fungal strain in question and selecting for clones expressing the appropriate enzyme activity (i.e. endoglucanase activity). The appropriate DNA sequence may then be isolated from the clone by standard procedures.

It is expected that a DNA sequence coding for a homologous enzyme, i.e. an analogous DNA sequence, is obtainable from other microorganisms. For instance, the DNA sequence may be derived by similarly screening a cDNA library of another fungus, such as a strain of an Aspergillus sp., in particular a strain of *A. aculeatus* or *A. niger*, a strain of Trichoderma sp., in particular a strain of *T. reesei, T. viride, T. longibrachiatum, T. harzianum* or *T. koningii* or a strain of a Fusarium sp., in particular a strain of *F. oxysporum*, or a strain of a Humicola sp., or a strain of a Neocallimastix sp., a Piromyces 25 sp., a Penicillium sp., an Agaricus sp., or a Phanerochaete sp.

Alternatively, the DNA coding for a endoglucanase of the invention may, in accordance with well-known procedures, conveniently be isolated from DNA from a suitable source, such as any of the above mentioned organisms, by use of synthetic oligonucleotide probes prepared on the basis of a DNA sequence.

The DNA sequence may subsequently be inserted into a recombinant expression vector. This may be any vector which may conveniently be subjected to recombinant DNA procedures, and the choice of vector will often depend on the host cell into which it is to be introduced. Thus, the vector may be an autonomously replicating vector, i.e. a vector which exists as an extrachromosomal entity, the replication of which is independent of chromosomal replication, e.g. a plasmid. Alternatively, the vector may be one which, when introduced into a host cell, is integrated into the host cell genome and replicated together with the chromosome(s) into which it has been integrated.

In the vector, the DNA sequence encoding the endoglucanase should be operably connected to a suitable promoter and terminator sequence. The promoter may be any DNA sequence which shows transcriptional activity in the host cell of choice and may be derived from genes encoding proteins either homologous or heterologous to the host cell. The procedures used to ligate the DNA sequences coding for the endoglucanase, the promoter and the terminator, respectively, and to insert them into suitable vectors are well known to persons skilled in the art (cf., for instance, Sambrook et al., *Molecular Cloning. A Laboratory Manual*, Cold Spring Harbor, N.Y., 1989).

The host cell which is transformed with the DNA sequence encoding the enzyme is preferably a eukaryotic cell, in particular a fungal cell such as a yeast or filamentous fungal cell. In particular, the cell may belong to a species of Aspergillus or Trichoderma, most preferably *Aspergillus oryzae* or *Aspergillus niger*. Fungal cells may be transformed by a process involving protoplast formation and transformation of the protoplasts followed by regeneration of the cell wall in a manner known per se. The use of Aspergillus as a host microorganism is described in EP 238 023 (of Novo Nordisk A/S). The host cell may also be a yeast cell, e.g. a strain of Saccharomyces, in particular *Saccharomyces cerevisiae, Saccharomyces kluyveri* or *Saccharomyces uvarum*, a strain of Schizosaccaromyces sp., such as *Schizosaccharomyces pombe*, a strain of Hansenula sp. Pichia sp., Yarrowia sp. such as *Yarrowia lipolytica*, or Kluyveromyces sp. such as *Kluyveromyces lactis*.

It is contemplated that the enzyme can be produced by culturing a suitable host cell transformed with a DNA sequence encoding the enzyme under conditions permitting the production of the enzyme, and recovering the resulting enzyme from the culture.

The medium used to culture the transformed host cells may be any conventional medium suitable for growing the host cells in question. The expressed cellulase (endoglucanase) may conveniently be secreted into the culture medium and may be recovered therefrom by well-known procedures including separating the cells from the medium by centrifugation or filtration, precipitating proteinaceous components of the medium by means of a salt such as ammonium sulphate, followed by chromatographic procedures such as ion exchange chromatography, affinity chromatography, or the like.

In a still further aspect, the present invention relates to the treatment of cellulose or cellulosic material with an enzyme preparation, which is enriched in an enzyme exhibiting endoglucanase activity as described above.

For example, the enzyme preparation of the present invention is useful for the degradation or modification of plant cell wall containing materials, said preparation being enriched in an enzyme with endoglucanase activity as described above. An example of such an enzyme preparation may be a preparation comprising multiple enzymatic activities, in particular an enzyme preparation comprising multiple plant cell wall degrading enzymes such as Pectinex®, Pectinex Ultra SP®, Celluclast or Celluzyme (all available from Novo Nordisk A/S). In the present context, the term "enriched" is intended to indicate that the endoglucanase activity of the enzyme preparation has been increased, e.g. with an enrichment factor of at least 1.1.

The enzyme preparation of the invention may be useful in a detergent composition, a fabric softener composition, for textile treatment, for providing a stone-washed look of dyed cellulosic fabric, for treatment of paper pulp, or for other uses which are described hereinafter.

Uses

Detergent Compositions

According to a preferred embodiment of the present invention, the enzyme preparation described herein is a component of a detergent composition. As such, it may be included in the detergent composition in the form of a non-dusting granulate, a stabilized liquid, or a protected enzyme preparation. Non-dusting granulates may be produced, e.g., as disclosed in U.S. Pat. No. 4,106,991 and 4,661,452 (both to Novo Industri A/S) and may optionally be coated by methods known in the art. Examples of waxy coating materials are poly(ethylene oxide) products (polyethyleneglycol, PEG) with mean molecular weights of 1000 to 20000; ethoxylated nonylphenols having from 16 to 50 ethylene oxide units; ethoxylated fatty alcohols in which the alcohol contains from 12 to 20 carbon atoms and in which there are 15 to 80 ethylene oxide units; fatty alcohols; fatty acids; and mono- and di- and triglycerides of fatty acids. Examples of film-forming coating materials suitable for application by fluid bed techniques are given in patent GB 1483591. Liquid enzyme preparations may, for instance, be stabilized by adding a polyol such as propylene glycol, a sugar or sugar alcohol, lactic acid or boric acid according to established methods. Other enzyme stabilizers are well known in the art. Protected enzymes may be prepared according to the method disclosed in EP 238,216.

The detergent composition of the invention may be in any convenient form, e.g. as powder, granules, paste or liquid. A liquid detergent may be aqueous, typically containing up to 70% water and 0–30% organic solvent, or nonaqueous.

The detergent composition comprises one or more surfactants, each of which may be anionic, nonionic, cationic, or zwitterionic. The detergent will usually contain 0–50% of anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap. It may also contain 0–40% of nonionic surfactant such as alcohol ethoxylate (AEO or AE), carboxylated alcohol ethoxylates, nonylphenol ethoxylate, alkylpolyglycoside, alkyldimethylamine oxide, ethoxylated fatty acid monoethanolamide, fatty acid monoethanolamide, or polyhydroxy alkyl fatty acid amide (e.g. as described in WO 92/06154).

The detergent composition may additionally comprise one or more other enzymes such as amylase, lipase, cutinase, protease, peroxidase, and oxidase, e.g. laccase).

The detergent may contain 1–65% of a detergent builder or complexing agent such as zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g. SKS-6 from Hoechst). The detergent may also be unbuilt, i.e. essentially free of detergent builder.

The detergent may comprise one or more polymers. Examples are carboxymethylcellulose (CMC), poly (vinylpyrrolidone) (PVP), polyethyleneglycol (PEG), poly (vinyl alcohol) (PVA), polycarboxylates such as polyacrylates, maleic/acrylic acid copolymers and lauryl methacrylate/acrylic acid copolymers.

The detergent may contain a bleaching system which may comprise a $H_2O_2$ source such as perborate or percarbonate which may be combined with a peracid-forming bleach activator such as tetraacetylethylenediamine (TAED) or nonanoyloxybenzenesulfonate (NOBS). Alternatively, the bleaching system may comprise peroxyacids of, e.g., the amide, imide, or sulfone type.

The enzymes of the detergent composition of the invention may be stabilized using conventional stabilizing agents, e.g. a polyol such as propylene glycol or glycerol, a sugar or sugar alcohol, lactic acid, boric acid, or a boric acid derivative such as, e.g., an aromatic borate ester, and the composition may be formulated as described in, e.g., WO 92/19709 and WO 92/19708.

The detergent may also contain other conventional detergent ingredients such as, e.g., fabric conditioners including clays, foam boosters, suds suppressors, anti-corrosion agents, soil-suspending agents, anti-soil-redeposition agents, dyes, bactericides, optical brighteners, or perfume.

The pH (measured in aqueous solution at use concentration) will usually be neutral or alkaline, e.g. in the range of 7–11.

Particular forms of detergent compositions within the scope of the invention include:

1) A detergent composition formulated as a granulate having a bulk density of at least 600 g/l comprising

| | |
|---|---|
| Linear alkylbenzenesulfonate (calculated as acid) | 7–12% |
| Alcohol ethoxysulfate (e.g. $C_{12-18}$ alcohol, 1–2 EO) or alkyl sulfate (e.g. $C_{16-18}$) | 1–4% |
| Alcohol ethoxylate (e.g. $C_{14-15}$ alcohol, 7 EO) | 5–9% |
| Sodium carbonate (as $Na_2CO_3$) | 14–20% |
| Soluble silicate (as $Na_2O, 2SiO_2$) | 2–6% |
| Zeolite (as $NaAlSiO_4$) | 15–22% |
| Sodium sulfate (as $Na_2SO_4$) | 0–6% |
| Sodium citrate/citric acid (as $C_6H_5Na_3O_7/C_6H_8O_7$) | 0–15% |
| Sodium perborate (as $NaBO_3.H_2O$) | 11–18% |
| TAED | 2–6% |
| Carboxymethylcellulose | 0–2% |
| Polymers (e.g. maleic/acrylic acid copolymer, PVP, PEG) | 0–3% |
| Enzymes (calculated as pure enzyme protein) | 0.0001–0.1% |
| Minor ingredients (e.g. suds suppressors, perfume, optical brightener, photobleach) | 0–5% |

2) A detergent composition formulated as a granulate having a bulk density of at least 600 g/l comprising

| | |
|---|---|
| Linear alkylbenzenesulfonate (calculated as acid) | 6–11% |
| Alcohol ethoxysulfate (e.g. $C_{12-18}$ alcohol, 1–2 EO or alkyl sulfate (e.g. $C_{16-18}$) | 1–3% |
| Alcohol ethoxysulfate (e.g. $C_{14-15}$ alcohol, 7 EO | 5–9% |
| Sodium carbonate (as $Na_2CO_3$) | 15–21% |
| Soluble silicate (as $Na_2O,2SiO_2$) | 1–4% |
| Zeolite (as $NaAlSiO_4$) | 24–34% |
| Sodium sulfate (as $Na_2SO_4$) | 4–10% |
| Sodium citrate/citric acid (as $C_6H_5Na_3O_7/C_6H_8O7$) | 0–15% |
| Carboxymethylcellulose | 0–2% |
| Polymers (e.g. maleic/acrylic acid copolymer, PVP, PEG) | 1–6% |
| Enzymes (calculated as pure enzyme protein) | 0.0001–0.1% |
| Minor ingredients (e.g. suds suppressors, perfume) | 0–5% |

| | |
|---|---|
| Linear alkylbenzenesulfonate (calculated as acid) | 5–9% |
| Alcohol ethoxylate (e.g. $C_{12-15}$ alcohol, 7 EO) | 7–14% |
| Soap as fatty acid (e.g. $C_{16-22}$ fatty acid) | 1–3% |
| Sodium carbonate (as $Na_2CO_3$) | 10–17% |
| Soluble silicate (as $Na_2O,2SiO_2$) | 3–9% |
| Zeolite (as $NaAlSiO_4$) | 23–33% |
| Sodium sulfate (as $Na_2SO_4$) | 0–4% |
| Sodium perborate (as $NaBO_3.H_2O$) | 8–16% |
| TAED | 2–8% |
| Phosphonate (e.g. EDTMPA) | 0–1% |
| Carboxymethylcellulose | 0–2% |
| Polymers (e.g. maleic/acrylic acid copolymer, PVP, PEG) | 0–3% |
| Enzymes (calculated as pure enzyme protein) | 0.0001–0.1% |
| Minor ingredients (e.g. suds suppressors, perfume, optical brightener) | 0–5% |

4) A detergent composition formulated as a granulate having a bulk density of at least 600 g/l comprising

| | |
|---|---|
| Linear alkylbenzenesulfonate (calculated as acid) | 8–12% |
| Alcohol ethoxylate (e.g. $C_{12-15}$ alcohol, 7 EO) | 10–25% |
| Sodium carbonate (as $Na_2CO_3$) | 14–22% |
| Soluble. silicate (as $Na_2O,2SiO_2$) | 1–5% |
| Zeolite (as $NaAlSi_4$) | 25–35% |
| Sodium sulfate (as $Na_2SO_4$) | 0–10% |
| Carboxymethylcellulose | 0–2% |
| Polymers (e.g. maleic/acrylic acid copolymer, PVP, PEG) | 1–3% |
| Enzymes (calculated as pure enzyme protein) | 0.0001–0.1% |
| Minor ingredients (e. g. suds suppressors, perfume) | 0–5% |

5) An aqueous liquid detergent composition comprising

| | |
|---|---|
| Linear alkylbenzenesulfonate (calculated as acid) | 15–21% |
| Alcohol ethoxylate (e.g. $C_{12-15}$ alcohol, 7 EO or $C_{12-15}$ alcohol, 5 EO) | 12–18% |
| Soap as fatty acid (e.g. oleic acid) | 3–13% |
| Alkenylsuccinic acid ($C_{12-14}$) | 0–13% |
| Aminoethanol | 8–18% |
| Citric acid | 2–8% |
| Phosphonate | 0–3% |
| Polymers (e.g. PVP, PEG) | 0–3% |
| Borate (as $B_4O_7$) | 0–2% |
| Ethanol | 0–3% |
| Propylene glycol | 8–14% |
| Enzymes (calculated as pure enzyme protein) | 0.0001–0.1% |
| Minor ingredients (e.g. dispersants, suds suppressors, perfume, optical brightener) | 0–5% |

6) An aqueous structured liquid detergent composition comprising

| | |
|---|---|
| Linear alkylbenzenesulfonate (calculated as acid) | 15–21% |
| Alcohol ethoxylate (e.g. $C_{12-15}$ alcohol,7 EO, or $C_{12-15}$alcohol,5 EO) | 3–9 |
| Soap as fatty acid (e.g. oleic acid) | 3–10% |

| Zeolite (as NaAlSiO₄) | 14–22% |
|---|---|
| Potassium citrate | 9–18% |
| Borate (as B₄O₇) | 0–2% |
| Carboxymethylcellulose | 0–2% |
| Polymers (e.g. PEG, PVP) | 0–3% |
| Anchoring polymers such as, e.g., lauryl methacrylate/ acrylic acid copolymer; molar ratio 25:1; MW 3800 | 0–3% |
| Glycerol | 0–5% |
| Enzymes (calculated as pure enzyme protein) | 0.0001–0.1% |
| Minor ingredients (e.g. dispersants; suds suppressors, perfume, optical brighteners) | 0–5% |

7) A detergent composition formulated as a granulate having a bulk density of at least 600 g/l comprising

| Fatty alcohol sulfate | 5–10% |
|---|---|
| Ethoxylated fatty acid monoethanolamide | 3–9% |
| Soap as fatty acid | 0–3% |
| Sodium carbonate (as Na₂CO₃) | 5–10% |
| Soluble silicate (as Na₂O,2SiO₂) | 1–4% |
| Zeolite (as NaAlSiO₄) | 20–40% |
| Sodium sulfate (as Na₂SO₄) | 2–8% |
| Sodium perborate (as NaBO₃.H₂O) | 12–18% |
| TAED | 2–7% |
| Polymers (e.g. maleic/acrylic acid copolymer, PEG) | 1–5% |
| Enzymes (calculated as pure enzyme protein) | 0.0001–0.1% |
| Minor ingredients (e.g. optical brightener, suds suppressors, perfume) | 0–5% |

8) A detergent composition formulated as a granulate comprising

| Linear alkylbenzenesulfonate (calculated as acid) | 8–14% |
|---|---|
| Ethoxylated fatty acid monoethanolamide | 5–11% |
| Soap as fatty acid | 0–3% |
| Sodium carbonate (as Na₂CO₃) | 4–10% |
| Soluble silicate (as Na₂O,2SiO₂) | 1–4% |
| Zeolite (as NaAlSiO₄) | 30–50% |
| Sodium sulfate (as Na₂SO₄) | 3–11% |
| Sodium citrate (as C₆H₅Na₃O₇) | 5–12% |
| Polymers (e.g. PVP, maleic/acrylic acid copolymer, PEG) | 1–5% |
| Enzymes (calculated as pure enzyme protein) | 0.0001–0.1% |
| Minor ingredients (e.g. suds suppressors, perfume) | 0–5% |

9) A detergent composition formulated as a granulate comprising

| Linear alkylbenzenesulfonate (calculated as acid) | 6–12% |
|---|---|
| Nonionic surfactant | 1–4% |
| Soap as fatty acid | 2–6% |
| Sodium carbonate (as Na₂CO₃) | 14–22% |
| Zeolite (as NaAlSiO₄) | 18–32% |
| Sodium sulfate (as Na₂SO₄) | 5–20% |
| Sodium citrate (as C₆H₅Na₃O₇) | 3–8% |
| Sodium perborate (as NaBO₃.H₂O) | 4–9% |
| Bleach activator (e.g. NOBS or TAED) | 1–5% |
| Carboxymethylcellulose | 0–2% |
| Polymers (e.g. polycarboxylate or PEG) | 1–5% |
| Enzymes (calculated as pure enzyme protein) | 0.0001–0.1% |
| Minor ingredients (e.g. optical brightener, perfume) | 0–5% |

10) An aqueous liquid detergent composition comprising

| Linear alkylbenzenesulfonate (calculated as acid) | 15–23% |
|---|---|
| Alcohol ethoxysulfate (e.g. C₁₂₋₁₅ alcohol, 2–3 EO) | 8–15% |
| Alcohol ethoxylate (e.g. C₁₂₋₁₅ alcohol, 7 EO, or C₁₂₋₁₅ alcohol, 5 EO) | 3–9% |
| Soap as fatty acid (e.g. lauric acid) | 0–3% |
| Aminoethanol | 1–5% |
| Sodium citrate | 5–10% |
| Hydrotrope (e.g. sodium toluensulfonate) | 2–6% |
| Borate (as B₄O₇) | 0–2% |
| Carboxymethylcellulose | 0–1% |
| Ethanol | 1–3% |
| Propylene glycol | 2–5% |
| Enzymes (calculated as pure enzyme protein) | 0.0001–0.1% |
| Minor ingredients (e. g. polymers, dispersants, perfume, optical brighteners) | 0–5% |

11) An aqueous liquid detergent composition comprising

| Linear alkylbenzenesulfonate (calculated as acid) | 20–32% |
|---|---|
| Alcohol ethoxylate (e.g. C₁₂₋₁₅ alcohol,7 EO, or C₁₂₋₁₅alcohol, 5 EO) | 6–12% |
| Aminoethanol | 2–6% |
| Citric acid | 8–14% |
| Borate (as B₄O₇) | 1–3% |
| Polymer (e.g. maleic/acrylic acid copolymer, anchoring polymer such as, e.g., lauryl methacrylate-/acrylic acid copolymer) | 0–3% |
| Glycerol | 3–8% |
| Enzymes (calculated as pure enzyme protein) | 0.0001–0.1% |
| Minor ingredients (e.g. hydrotropes, dispersants, perfume, optical brighteners) | 0–5% |

12) A detergent composition formulated as a granulate having a bulk density of at least 600 g/l comprising

| Anionic surfactant (linear alkylbenzenesulfonate, alkyl sulfate, alpha-olefinsulfonate, alpha-sulfo fatty acid methyl esters, alkanesulfonates, soap) | 25–40% |
|---|---|
| Nonionic surfactant (e.g. alcohol ethoxylate) | 1–10% |
| Sodium carbonate (as Na₂CO₃) | 8–25% |
| Soluble silicates (as Na₂O, 2SiO₂) | 5–15% |
| Sodium sulfate (as Na₂SO₄) | 0–5% |
| Zeolite (as NaAlSiO₄) | 15–28% |
| Sodium perborate (as NaBO₃.4H₂O) | 0–20% |
| Bleach activator (TAED or NOBS) | 0–5% |
| Enzymes (calculated as pure enzyme protein) | 0.0001–0.1% |
| Minor ingredients (e. g. perfume, optical brighteners) | 0–3% |

13) Detergent formulations as described in 1)–12) wherein all or part of the linear alkylbenzenesulfonate is replaced by (C₁₂–C₁₈) alkyl sulfate.

14) A detergent composition formulated as a granulate having a bulk density of at least 600 g/l comprising

| (C₁₂–C₁₈) alkyl sulfate | 9–15% |
|---|---|
| Alcohol ethoxylate | 3–6% |
| Polyhydroxy alkyl fatty acid amide | 1–5% |
| Zeolite (as NaAlSiO₄) | 10–20% |
| Layered disilicate (e.g. SK56 from Hoechst) | 10–20% |
| Sodium carbonate (as Na₂CO₃) | 3–12% |
| Soluble silicate (as Na₂O,2SiO₂) | 0–6% |
| Sodium citrate | 4–8% |
| Sodium percarbonate | 13–22% |
| TAED | 3–8% |
| Polymers (e.g. polycarboxylates and PVP = | 0–5% |
| Enzymes (calculated as pure enzyme protein) | 0.0001–0.1% |
| Minor ingredients (e.g. optical brightener, photo bleach, perfume, suds suppressors) | 0–5% |

15) A detergent composition formulated as a granulate having a bulk density of at least 600 g/l comprising

| (C₁₂–C₁₈) alkyl sulfate | 4–8% |
|---|---|
| Alcohol ethoxylate | 11–15% |
| Soap | 1–4% |

-continued

| | |
|---|---|
| Zeolite MAP or zeolite A | 35–45% |
| Sodium carbonate (as $Na_2CO_3$) | 2–8% |
| Soluble silicate (as $Na_2O,2SiO_2$) | 0–4% |
| Sodium Percarbonate | 13–22% |
| TAED | 1–8% |
| Carboxymethyl cellulose | 0–3% |
| Polymers (e.g. polycarboxylates and PVP) | 0–3% |
| Enzymes (calculated as pure enzyme protein) | 0.0001–0.1% |
| Minor ingredients (e.g. optical brightener, phosphonate, perfume) | 0–3% |

16) Detergent formulations as described in 1)–15) which contain a stabilized or encapsulated peracid, either as an additional component or as a substitute for already specified bleach systems.

17) Detergent compositions as described in 1), 3), 7), 9) and 12) wherein perborate is replaced by percarbonate.

18) Detergent compositions as described in 1), 3), 7), 9), 12), 14) and 15) which additionally contain a manganese catalyst. The manganese catalyst may, e.g., be one of the compounds described in "Efficient manganese catalysts for low-temperature bleaching", *Nature* 369, 1994, pp. 637–639.

19) Detergent composition formulated as a nonaqueous detergent liquid comprising a liquid nonionic surfactant such as, e.g., linear alkoxylated primary alcohol, a builder system (e.g. phosphate), enzyme and alkali. The detergent may also comprise anionic surfactant and/or a bleach system.

The cellulase preparation described herein may be incorporated in concentrations conventionally employed in detergents. It is at present contemplated that, in the detergent composition of the invention, the cellulase may be added in an amount corresponding to 0.00001–1 mg (calculated as pure enzyme protein) of cellulase per liter of wash liquor.

Pulp and Paper Applications

In the papermaking pulp industry, the enzyme preparation described herein may be applied advantageously e.g. as follows:

For debarking: pretreatment with the enzyme preparation may degrade the cambium layer prior to debarking in mechanical drums resulting in advantageous energy savings.

For defibration: treatment of a material containing cellulosic fibers with the enzyme preparation prior to refining or beating may result in reduction of the energy consumption due to the hydrolyzing effect of the cellulase on the interfibre surfaces. Use of the enzyme preparation may result in improved energy savings as compared to the use of known enzymes, since it is believed that the enzyme composition of the invention may possess a higher ability to penetrate fibre walls.

For fibre modification, i.e. improvement of fibre properties where partial hydrolysis across the fibre wall is needed which requires deeper penetrating enzymes (e.g. in order to make coarse fibers more flexible). Deep treatment of fibers has so far not been possible for high yield pulps e.g. mechanical pulps or mixtures of recycled pulps. This has been ascribed to the nature of the fibre wall structure that prevents the passage of enzyme molecules due to physical restriction of the pore matrix of the fibre wall. It is contemplated that the enzyme composition is capable of penetrating into the fibre wall.

For drainage improvement. The drainability of papermaking pulps may be improved by treatment of the pulp with hydrolyzing enzymes, e.g. cellulases. Use of the enzyme preparation may be more effective, e.g. result in a higher degree of loosening bundles of strongly hydrated microfibrils in the fines fraction (consisting of fibre debris) that limits the rate of drainage by blocking hollow spaces between fibers and in the wire mesh of the paper machine. The Canadian standard freeness (CSF) increases and the Schopper-Riegler drainage index decreases when pulp in subjected to cellulase treatment, see e.g. U.S. Pat. No. 4,923,565; TAPPI T227, SCAN C19:65.ence.

For inter fibre bonding. Hydrolytic enzymes are applied in the manufacture of papermaking pulps for improving the inter fibre bonding. The enzymes rinse the fibre surfaces for impurities e.g. cellulosic debris, thus enhancing the area of exposed cellulose with attachment to the fibre wall, thus improving the fibre-to-fibre hydrogen binding capacity. This process is also referred to as dehornification. Paper and board produced with a cellulase containing enzyme preparation may have an improved strength or a reduced grammage, a smoother surface and an improved printability. These improvements are believed to be a result of the improved penetrability of the modified/derivatised enzyme(s).

For enzymatic deinking. Partial hydrolysis of recycled paper during or upon pulping by use of hydrolyzing enzymes such as cellulases are known to facilitate the removal and agglomeration of ink particles. Use of the enzyme preparation may give a more effective loosening of ink from the surface structure due to a better penetration of the enzyme molecules into the fibrillar matrix of the fibre wall, thus softening the surface whereby ink particles are effectively loosened. The agglomeration of loosened ink particles are also improved, due to a more efficient hydrolysis of cellulosic fragments found attached to ink particles originating from the fibres.

The treatment of lignocellulosic pulp may, e.g., be performed as described in WO 91/14819, WO 91/14822, WO 92/17573 and WO 92/18688.

Textile Applications

In another embodiment, the present invention relates to use of the enzyme preparation described herein in the bio-polishing process. Bio-Polishing is a specific treatment of the yarn surface which improves fabric quality with respect to handle and appearance without loss of fabric wettability. The most important effects of Bio-Polishing can be characterized by less fuzz and pilling, increased gloss/luster, improved fabric handle, increased durable softness and altered water absorbency. Bio-Polishing usually takes place in the wet processing of the manufacture of knitted and woven fabrics. Wet processing comprises such steps as e.g. desizing, scouring, bleaching, washing, dying/printing and finishing. During each of these steps, the fabric is more or less subjected to mechanical action. In general, after the textiles have been knitted or woven, the fabric proceeds to a desizing stage, followed by a scouring stage, etc. Desizing is the act of removing size from textiles. Prior to weaving on mechanical looms, warp yarns are often coated with size starch or starch derivatives in order to increase their tensile strength. After weaving, the size coating must be removed before further processing the fabric in order to ensure a homogeneous and wash-proof result. It is known that in order to achieve the effects of Bio-Polishing, a combination of cellulytic and mechanical action is required. It is also known that "super-softness" is achievable when the treatment with cellulase is combined with a conventional treatment with softening agents. It is contemplated that use of the enzyme preparation for bio-polishing of cellulosic fabrics is advantageous, e.g. a more thorough polishing can be achieved. Bio-polishing may be obtained by applying the method described e.g. in WO 93/20278.

Stone-washing

It is known to provide a "stone-washed" look (localized abrasion of the color) in dyed fabric, especially in denim fabric or jeans, either by washing the denim or jeans made from such fabric in the presence of pumice stones to provide the desired localized lightening of the color of the fabric or by treating the fabric enzymatically, in particular with cellulytic enzymes. The treatment with an enzyme preparation as described herein may be carried out either alone such as disclosed in U.S. Pat. No. 4,832,864, together with a smaller amount of pumice than required in the traditional process, or together with perlite such as disclosed in WO 95/09225.

Determination of Cellulytic Activity

Cellulytic enzymes hydrolyze CMC, thereby increasing the viscosity of the incubation mixture. The resulting reduction in viscosity may be determined by a vibration viscosimeter (e.g. MIVI 3000 from Sofraser, France). Determination of the cellulytic activity, measured in terms of S-CEVU, may be determined according to the assay described below:

The S-CEVU assay quantifies the amount of catalytic activity present in the sample by measuring the ability of the sample to reduce the viscosity of a solution of carboxymethylcellulose (CMC). The assay is carried out at 40° C.; pH 7.5; 0.1 M phosphate buffer; time 30 min; using a relative enzyme standard for reducing the viscosity of the CMC substrate (carboxymethylcellulose Hercules 7 LFD); enzyme concentration approx. 0.15 S-CEVU/ml.

Further, 1 Savi U (unit) is defined as the amount of enzyme capable of forming 1 µmole of glucose equivalents per minute.

The invention is further illustrated by the following non-limiting examples.

EXAMPLE 1

Determination of Endoglucanase Activity in Cellulase Preparation from *Coprinus micaceus* (Bull.:Fr.)Fr.

Strain

*Coprinus micaceus* (Bull.: Fr.)Fr., Section Micacei Fr.

Deposited as CBS 816.95 on Dec. 19, 1995.

The *Coprinus micaceus*, CBS 816.95, strain was isolated from the Botanical garden in Copenhagen.

The isolated strain was grown on conventional potato dextrose agar to which cellulose was added (Solcafloc cellulose fibers, Avicel or a combination thereof). Endoglucanase activity of was determined by a conventional plate assay method using Azur crosslinked-HEC blue granules. The following results were obtained:

pH 3: No activity
pH 7: good activity (++)
pH 9.5: good activity (++).

Endoglucanase Activity in the Presence of Detergent

The endoglucanase activity in the presence of the conventional detergent linear alkylbenzenesulfonate (LAS) was determined by a similar plate assay wherein 0.05% was added to the plates. The following results were obtained:

pH 3: No activity
pH 7: moderate activity (+)
pH 9.5: good activity (++).

Endoglucanase Activity in Dependence of Temperature

The following endoglucanase activity was determined after heating to 50° C. for 1 hour:

pH 3: No activity
pH 7: good activity (++)
pH 9.5: good activity (++).

Further, the strain was cultured in liquid fermentation, i.e. in 100 ml shake flasks at 26° C. and stirring at 150 rpm on a conventional potato dextrose medium to which cellulose was added (Solcafloc cellulose fibers, Avicel or a combination thereof).

EXAMPLE 2

Performance of Cellulase from *Coprinus micaceus* Measured as Removal of Surface Fibrils and Fibers Protruding from the Yarn of a Textile Containing Cellulosic Fibers Apparatus: Terg-o-tometer
Liquid volume: 100 ml
Agitation: 150 movements/min with vertical stirrer
Rinse time: 10 min in tap water
Washing temp: 40° C.
Washing liquor: 0.05 M phosphate buffer, pH 7.0
Washing time: 30 min; 2 repetitions
Textile: 2 swatches of aged black 100% cotton 5×6 cm
Drying: Tumble dry
Cellulase: *Coprinus micaceus*, CBS 816.95

Evaluation

When the surface fibrils and fibers protruding from the yarn are removed by cellulase, the surface of the black fabric appears darker and free from fuzz. A test panel of three persons ranks the swatches relative to each other. They are given a number starting with 1 from the "ugliest" and up to 18 for the "nicest" swatch. Swatches with values above 10 have a very improved surface appearance. Swatches with values above 7 have a clearly visible improved surface appearance.

Two different dosages were tested and compared with a blind sample. The average score given by the test panel is shown below.

| S-CEVU/l: | 0 | 500 | 2500 | |
|---|---|---|---|---|
| CBS 816.95 | 3 | 8 | 17 | Panel score unit |

The result shows that the *Coprinus micaceus* cellulase gives good color clarification.

EXAMPLE 3

Determination of Endoglucanase Activity in Cellulase Preparation from *Coprinus ephemerus* (Bull.:Fr.)Fr.

Strain

*Coprinus domesticus* (Bolt.: Fr.)S. F. Gray, Section Micacei Fr.

Deposited as CBS 817.95 on Dec. 19, 1995.

The *Coprinus domesticus*, CBS 817.95, strain was isolated from the Danish beech forest named Krenkerup Hareskov.

The isolated strain was grown on conventional potato dextrose agar to which cellulose was added (Solcafloc cellulose fibers, Avicel or a combination thereof).

Endoglucanase activity of was determined by a conventional plate assay method using Azur crosslinked-HEC blue granules. The following results were obtained:

pH 3: No activity
pH 7: very high activity (+++)
pH 9.5: good activity (++).

Endoglucanase Activity in the Presence of Detergent

The endoglucanase activity in the presence of the conventional detergent linear alkylbenzenesulfonate (LAS) was determined by a similar plate assay wherein 0.05% was added to the plates. The following results were obtained:

pH 3: No activity
pH 7: moderate activity (+)
pH 9.5: moderate activity (+).

Endoglucanase Activity in Dependence of Temperature

The following endoglucanase activity was determined after heating to 50° C. for 1 hour:

pH 3: No activity
pH 7: moderate activity (+)

pH 9.5: moderate activity (+).

Further, the strain was cultured in liquid fermentation, i.e. in 100 ml shake flasks at 26° C. and stirring at 150 rpm on a conventional potato dextrose medium to which cellulose was added (Solcafloc cellulose fibers, Avicel or a combination thereof).

EXAMPLE 4

Performance of Cellulase from *Coprinus domesticus* Measured as Removal of Surface Fibrils and Fibers Protruding from the Yarn of a Textile Containing Cellulosic Fibers The test described in example 2 was carried out with cellulase from *Coprinus domesticus*, CBS 817.95.

Two different dosages were tested and compared with a blind sample. The average score given by the test panel is shown below.

| S-CEVU/l: | 0 | 500 | 2500 | |
|---|---|---|---|---|
| CBS 817.95 | 3 | 8 | 12 | Panel score unit |

The result shows that the *Coprinus domesticus* cellulase gives good color clarification.

EXAMPLE 5

Determination of Endoglucanase Activity in Cellulase Preparation from *Coprinus ephemerus* (Bull.:Fr.)Fr.

Strain

*Coprinus ephemerus* (Bull.:Fr.)Fr., Section Setulosi Lange. Deposited as CBS 821.95 on Dec. 19, 1995.

The *Coprinus ephemerus*, CBS 821.95, strain was isolated close to the Danish deciduous forest named Grib Skov.

The isolated strain was grown on conventional potato dextrose agar to which cellulose was added (Solcafloc cellulose fibers, Avicel or a combination thereof).

Endoglucanase activity of was determined by a conventional plate assay method using Azur crosslinked-HEC blue granules. The following results were obtained:
pH 3: No activity
pH 7: good activity (++)
pH 9.5: good activity (++).
Endoglucanase Activity in the Presence of Detergent The endoglucanase activity in the presence of the conventional detergent linear alkylbenzenesulfonate (LAS) was determined by a similar plate assay wherein 0.05% was added to the plates. The following results were obtained:
pH 3: No activity
pH 7: moderate activity (+)
pH 9.5: moderate activity (+).

Further, it was found that the enzyme preparation produced by *C. ephemerus* also had a good activity (++) against Azur cross linked xyloglucan substrate.

EXAMPLE 6

Determination of Endoglucanase Activity in Cellulase Preparation from *Coprinus disseminates* (Pers.: Fr.)S. F. Gray Strain

*Coprinus disseminatus* (Pers.:Fr.)S. F. Gray, Section Setulosi Lange

The *Coprinus disseminatus* strain was isolated from a Danish deciduous forest, growing on a rotten stump of beech.

The strain was isolated by multisporic inoculum, and the isolated strain was grown on conventional potato dextrose agar to which cellulose was added (Solcafloc cellulose fibers, Avicel or a combination thereof).

Endoglucanase activity of was determined by a conventional plate assay method using Azur crosslinked-HEC blue granules. The following results were obtained:
pH 3: no activity
pH 7: no activity
pH 9.5: moderate activity (+).

EXAMPLE 7

Determination of Endoglucanase Activity in Cellulase Preparation from *Coprinus radians* (Desm.:Fr.)Fr.

Strain

*Coprinus radians* (Desm.:Fr.)Fr., Section hemerobi Fr. Deposited as CBS 818.95 on Dec. 19, 1995.

The *Coprinus radians*, CBS 818.95, strain was isolated from the Danish churchyard named Vestre Kirkegård.

The isolated strain was grown on wheat bran.

Endoglucanase activity was determined by a conventional plate assay method using Azur crosslinked-HEC blue granules. The following results were obtained:
pH 3: No activity
pH 7: Very high activity (+++)
pH 9.5: Good activity (++).
Endoglucanase Activity in the Presence of Detergent The endoglucanase activity in the presence of the conventional detergent linear alkylbenzenesulfonate (LAS) was determined by a similar plate assay wherein 0.05% was added to the plates. The following results were obtained:
pH 3: No activity
pH 7: moderate activity (+)
pH 9.5: moderate activity (+).

Further, it was found that the enzyme preparation produced by *C.radians* had very high activity (+++) against Azur cross linked xyloglucan substrate.

EXAMPLE 8

Determination of Endoglucanase Activity in Cellulase Preparation from *C. picaceus, C. frisei* and *C. subimpatiens*

Strains

*Coprinus picaceus*, Section Coprinus Fr;
*Coprinus frisei*, Section Coprinus;
*Coprinus subimpatiens*

The strains were grown on conventional potato dextrose agar to which cellulose was added (Solcafloc cellulose fibers, Avicel or a combination thereof).

Endoglucanase activity of was determined by a conventional plate assay method using Azur crosslinked-HEC blue granules. The following results were obtained for all three species:
pH 3: no activity
pH 7: good activity (++)
pH 9.5: moderate activity (+).

EXAMPLE 9

Determination of Endoglucanase Activity in Cellulase Preparation from *Psathyrella candolleana*

Strain

*Psathyrella candolleana,* Coprinaceae.
Deposited as CBS 628.95 in 1995.
The strain was grown on wheat bran.

Endoglucanase activity of was determined by a conventional plate assay method using Azur crosslinked-HEC blue granules. The following results were obtained for all three species:
pH 3: no activity
pH 7: good activity (++)
pH 9.5: moderate activity (+).

EXAMPLE 10

Determination of Endoglucanase Activity in Cellulase Preparation from *Psathyrella prona*

Strain
*Psathyrella prona*, Coprinaceae.
Deposited as CBS 822.95 on Dec. 19, 1995.
The strain was isolated from the Danish forest named Grib skov.
The isolated strain was grown on wheat bran.

Endoglucanase activity of was determined by a conventional plate assay method using Azur crosslinked-HEC blue granules. The following results were obtained for all three species:
pH 3: no activity
pH 7: very high activity (+++)
pH 9.5: very high activity (+++).

EXAMPLE 11
Determination of Endoglucanase Activity in Cellulase Preparation from *Panaeolus semiovatus* (syn *P. fimiputris*)
Strain
*Panaeolus semiovatus* (syn *P. fimiputris*), Coprinaceae.
Deposited as CBS 819.95 on Dec. 19, 1995.

Fruiting bodies of this strain were collected in Iceland and later isolated by multisporic inoculum and grown on potato dextrose agar plates. After transferring to wheat bran, enzyme activity was detectable.

Endoglucanase activity was determined by a conventional plate assay method using Azur crosslinked-HEC blue granules. The following results were obtained:
pH 3: no activity
pH 7: very high activity (+++)
pH 9.5: moderate activity (+).

Further, it was found that the enzyme preparation produced by *Panaeolus semiovatus* also a very high activity (+++) against Azur cross linked xyloglucan substrate. *Panaeolus sphinctrinus* was treated like described for *Panaeolus semiovatus*.

Endoglucanase activity of *Panaeolus sphinctrinus* was determined as described above with the following results:
pH 3: no activity
pH 7: good activity (++)
pH 9.5: no activity.

EXAMPLE 12
Determination of Endoglucanase Activity in Cellulase Preparation from *Podaxis pistillaris*
Strain
*Podaxis pistillaris*, Coprinaceae.
Deposited as ATCC 38868.
The strain was isolated by multisporic cultures from fruiting bodies.
The isolated strain was grown on wheat bran.

Endoglucanase activity was determined by a conventional plate assay method using Azur crosslinked-HEC blue granules. The following results were obtained:
pH 3: good activity (++)
pH 7: moderate activity (+)
pH 9.5: no activity

EXAMPLE 13
Determination of Endoglucanase Activity in Cellulase Preparation from *Bolbitius aleuriatus* (syn *B. reticulatus*)
Strain
*Bolbitius aleuriatus* (syn *B. reticulatus*), Bolbitiaceae.
Deposited as CBS 8205 on Dec. 19, 1995.
The *Bolbitius aleuriatus*, CBS 820.95, strain was isolated from a field close to Helsingborg, Sweden.

The isolated strain was grown on conventional potato dextrose agar to which cellulose was added (Solcafloc cellulose fibers, Avicel or a combination thereof).

Endoglucanase activity of was determined by a conventional plate assay method using Azur crosslinked-HEC blue granules. The following results were obtained:
pH 3: No activity
pH 7: very high activity (+++)
pH 9.5: good activity (++).

Endoglucanase Activity in the Presence of Detergent

The endoglucanase activity in the presence of the conventional detergent linear alkylbenzenesulfonate (LAS) was determined by a similar plate assay wherein 0.05% was added to the plates. The following results were obtained:
pH 3: No activity
pH 7: moderate activity (+)
pH 9.5: moderate activity (+).

Endoglucanase Activity in Dependence of Temperature

The following endoglucanase activity was determined after heating to 50° C. for 1 hour:
pH 3: No activity
pH 7: good activity (++)
pH 9.5: good activity (++).

Further, the strain was cultured in liquid fermentation, i.e. in 100 ml shake flasks at 26° C. and stirring at 150 rpm on a conventional potato dextrose medium to which cellulose was added (Solcafloc cellulose fibers, Avicel or a combination thereof).

EXAMPLE 14
Performance of Cellulase from *Coprinus micaceus* Measured as Removal of Surface Fibrils and Fibers Protruding from the Yarn of a Textile Containing Cellulosic Fibers Apparatus: Terg-o-tometer
Liquid volume: 100 ml
Agitation: 150 movements/min with vertical stirrer
Rinse time: 5 min in tap water
Washing temp: 40° C.
Washing liquor: 0.05 M phosphate buffer, pH 7.0
Washing time: 30 min; 2 repetitions
Textile: 2 swatches of aged black 100% cotton 5×6 cm
Drying: Tumble dry
Cellulase: *Bolbitius aleuriatus*, CBS 820.95
Evaluation:

The light remission was measured by a Datacolor Elrepho Remission spectrophotometer. Remission is calculated as ΔL (Hunter Lab. values). When the surface fibrils and fibers protruding from the yarn are removed by the cellulase, the surface of the black fabric appears darker, and lower L values are obtained.

| S-CEVU/l: | 0 | 500 | 2500 |
| --- | --- | --- | --- |
| CBS 820.95 | 0 | −0.94 ± 0.31 | −1.79 ± 0.16 |

The result shows that the *Bolbitius aleuriatus*, CBS 820.85, cellulase gives good color clarification.

EXAMPLE 15
Determination of Alkaline Cellulase Activity on Amorphous Cellulose
Materials and Methods
Substrate Preparation 20 gram acid-swollen AVICEL® stock solution (see below for a preparation which can be stored for one month) was centrifuged for 20 min. at 5000 rpm, the supernatant was poured off, and the sediment was resuspended in 30 ml of buffer. Then the suspension was centrifuged for 20 min. at 5000 rpm, the supernatant was poured off, and the sediment was resuspended in buffer to a total of 30 g. This corresponds to a substrate concentration of 10 g AVICEL/1.

Buffer 0.1 M Barbital at pH 8.5 or 0.1 M Glycine at pH 10.0

Enzyme Solution

The enzymes were diluted to an activity of 0.2–1 S-CEVU/ml at pH 8.5 or pH 10.0.

Reagents

2% NaOH, PHBAH-reagent: 1.5 g of p-hydroxy benzoic acid hydrazide and 5.0 g sodium tartrate was dissolved in 100 ml of 2% NaOH.

The substrate, the buffer and the enzyme solution were mixed to a final substrate concentration of 4.00 g/l.

Preparation of Acid Swollen Cellulose

Materials 5 g Avicel® (Art. 2331 Merck)
150 ml 85% ortho-phosphoric acid (Art. 573 Merck)
400 ml acetone (Art. 14 Merck)
1.3 l deionized water (Milli Q)
1 l glass beaker
1 l glass filter funnel
2 l suction flask
Ultra Turrax Homogenizer Procedure Acetone and phosphoric acid was cooled on ice.

5 g Avicel® was moistened with water, then 150 ml of ice cold 85% ortho-phosphoric acid was added, and the mixture was placed on ice bath with weak stirring for 1 h. 100 ml of ice cold acetone was added with stirring, followed by transfer of the mixture to a glass filter funnel, followed by washing with 3×100 ml ice cold acetone and dry suction after each washing.

The filter cake was washed with 2×500 ml water and sucked as dry as possible after each wash.

The filter cake was resuspended to a total volume of 300 ml and blended to homogeneity (using the Ultra Turrax Homogenizer).

The resulting product was stored in a refrigerator.

The substrate/buffer solution was preheated for 5 min at 40° C. Then the enzyme solution was added and the solution was whirlmixed for 5 sec., followed by incubation for 20 min. at 40° C. The reaction was stopped by adding 500 µl 2% NaOH solution, followed by whirlmixing for 5 sec. The samples were centrifuged for 20 min. at 5000 rpm. 1000 µl of supernatant was transferred from the test tubes to new test tubes, and 500 µl PHBAH-reagent was added, followed by boiling for 10 min. The test tubes were cooled in ice water.

The absorbance of the samples were measured on a spectrophotometer at 410 nm.

Standard Glucose Curve

A stock solution containing 300 mg/l was diluted to 5, 10, 15 and 25 mg/l, respectively. 1000 µl of the diluted standards were mixed with 500 µl of PHBAH-reagent and were treated as the other samples, see above.

Definition

1 Savi U (unit) is defined as the amount of enzyme capable of forming 1 µmole of glucose equivalents per minute.

Determination of Activity

The release of reducing glucose equivalent was calculated using the standard curve.

The results are shown in the table below.

The activity of the culture fluid supernatant was measured in S-CEVU/ml.

TABLE (Activity)

| Enzyme compositions (strain) | S-CEVU/ml | Savi U/ml pH 8.5 | Savi U/ml pH 10 |
|---|---|---|---|
| *Coprinus micaceus*, CBS 817.95 | 10 | 0.5 | 0.1 |
| *Coprinus cinereus*, IFO 30116 | 82 | 22.1 | 8.0 |
| *Coprinus domesticus*, CBS 816.95 | 23 | 1.5 | n.d. |

EXAMPLE 16

Performance of Cellulase from *Coprinus cinereus* Measured as Removal of Surface Fibrils and Fibers Protruding from the Yarn of a Textile Containing Cellulosic Fibers Apparatus: Terg-o-tometer
Liquid volume: 100 ml
Agitation: 150 movements/min with vertical stirrer
Rinse time: 10 min in tapwater
Washing temp: 40°
Water hardness: 1 mM $CaCl_2$
Washing liquor: I)1.0 g/l US type powder detergent with high anionic/nonionic ratio, pH 10.0. II) 2.0 g/l mild liquid color detergent with high nonionic/anionic ratio, pH 7.5
Washing time: I)12 min; 7 repetitions II) 30 min; 5 repetitions
Textile: 3 swatches of aged black 100% cotton 5×6 cm
Drying: Tumble dry
Cellulase: Coprinus cinereus, IFO 30116.

Evaluation

When the surface fibrils and fibers protruding from the yarn are removed by cellulase, the surface of the black fabric appears darker and free from fuzz. A test panel ranks the swatches relative to each other. They are given a number starting with 1 from the "ugliest" and up to 14 for the "nicest" swatch. Swatches with values above 10 have a very improved surface appearance. Swatches with values above 4 have a clearly visible improved surface appearance.

Two different dosages were tested and compared with a blind sample. Separate experiments were carried out for the two detergents, with different numbers of repetitions and washing time, therefore the performance cannot be compared directly in-between the trials.

| S-CEVU/l: | 0 | 100 | 500 | |
|---|---|---|---|---|
| I) US HDG type, pH 10 | 2.5 | 7.5 | 13.5 | Panel score units |
| II) Liquid citrate built, pH 7.5 | 2.3 | 7.7 | 11.0 | Panel score units |

The data show that the *Coprinus cinereus* cellulase gives good color clarification in the two tested detergent matrixes.

We claim:

1. A detergent composition comprising an enzyme preparation with substantial cellulytic activity at alkaline conditions which is derived from or produced by a fungus selected from the Basidiomycetous families Coprinaceae and Bolbitiaceae and a surfactant and optionally one or more components selected from the group consisting of sequestering agents, inorganic salts, additional enzymes, enzyme activators or accelerators, chlorine capturing or reducing agents, bleaching agents, bleach activators, solubilizing agents, perfumes, antioxidants, pigments, and water, wherein the fungus is selected from the group consisting of *Coprinus micaceus, Coprinus domesticus, Coprinus ephemerus, Coprinus disseminatus, Coprinus radians, Coprinus-*

*picaceus, Coprinus frisei, Coprinus subimpatiens, Psathyrella candolleana, Psathyrella prona, Panaeolus semiovatus, Podaxis pistillaris* and *Bolbitius aleuriatus.*

2. An enzyme preparation with substantial cellulytic activity at alkaline conditions, wherein the enzyme is derived from a fungus selected from the group of strains belonging to the species *Coprinus micaceus, Coprinus domesticus, Coprinus ephemerus, Coprinus disseminatus, Coprinus radians, Coprinus picaceus, Coprinus frisei, Coprinus subimpatiens, Psathyrella candolleana, Psathyrella prona, Panaeolus semiovatus, Podaxis pistillaris* and *Bolbitius aleuriatus.*

3. The enzyme preparation of claim 2 derived from or produced by the strain *Coprinus micaceus*, CBS 816.95.

4. The enzyme preparation of claim 2 derived from or produced by the strain *Coprinus domesticus*, CBS 817.95.

5. The enzyme preparation of claim 2 derived from or produced by the strain *Coprinus ephemerus*, CBS 821.95.

6. The enzyme preparation of claim 2 derived from or produced by the strain *Coprinus radians*, CBS 818.95.

7. The enzyme preparation of claim 2 derived from or produced by the strain *Podaxis pistillaris*, ATCC 38868.

8. The enzyme preparation of claim 2 derived from or produced by the strain *Bolbitius aleuriatus*, CBS 820.95.

9. The enzyme preparation of claim 2 derived from or produced by the strain *Panaeolus semiovatus* (syn. *P. fimiputris*), CBS 819.95.

10. The enzyme preparation of claim 2 derived from or produced by the strain *Psathyrella prona*, CBS 822.95.

11. The enzyme preparation of claim 2 derived from or produced by the strain *Psathyrella candolleana*, CBS 628.95.

12. The enzyme preparation of claim 2, wherein the enzyme is an endoglucanase.

13. The enzyme preparation of claim 2, which is stable in the presence of sodium linear alkylbenzene sulphonate, sodium polyoxyethylene alkyl sulphate, sodium dodecyl sulphate, sodium $\alpha$-olefin sulphonate, sodium alkyl sulphonate, or $\alpha$-sulpho-fatty acid ester.

14. The enzyme preparation of claim 2 which additionally comprises one or more enzymes selected from the group consisting of galactanases, xylanases, arabinanases, pectin acetyl esterases, polygalacturonases, rhamnogalacturonases, pectin lyases, pectate lyases, endo-glucanases, pectin methylesterases, proteases, lipases, amylases, cutinases, peroxidases, laccases, cellobiohydrolases and transglutaminases.

15. A method for the production of the enzyme preparation of claim 11, comprising cultivating in a suitable nutrient medium a strain selected from the group consisting of *Coprinus micaceus*, CBS 816.95, *Coprinus domesticus*, CBS 817.95, *Coprinus ephemerus* CBS 821.95, *Coprinus radians*, CBS 818.95, *Podaxis pistillaris*, ATCC 38868, *Panaeolus semiovatus* (syn. *P. fimiputris*), CBS 819.95, *Bolbitius aleuriatus*, CBS 820.95, *Psathyrella prona*, CBS 822.95, *Psathyrella candolleana*, CBS 628.95, and recovering the enzyme composition from the resulting medium.

\* \* \* \* \*